B. GRANVILLE.
APPARATUS FOR FORMING TIRE MOLDS.
APPLICATION FILED JAN. 18, 1917.
1,299,456. Patented Apr. 8, 1919.
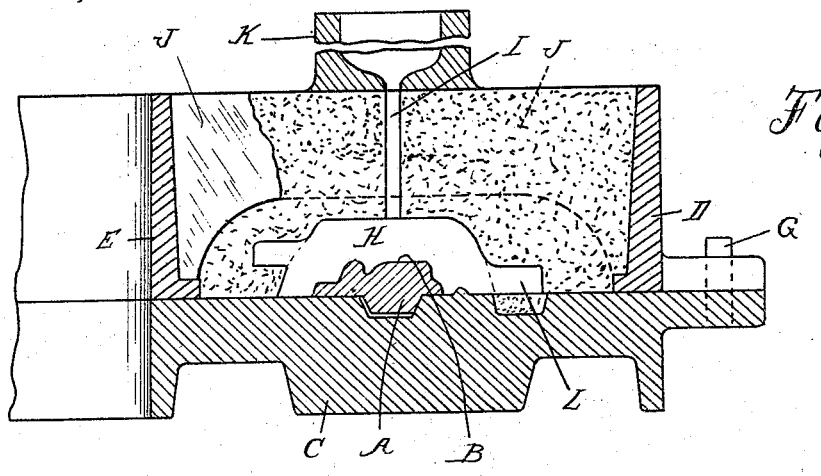
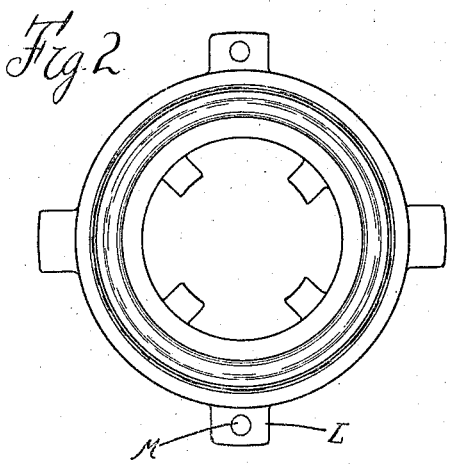
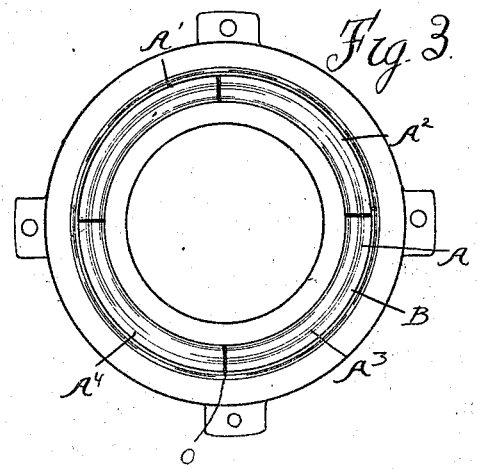
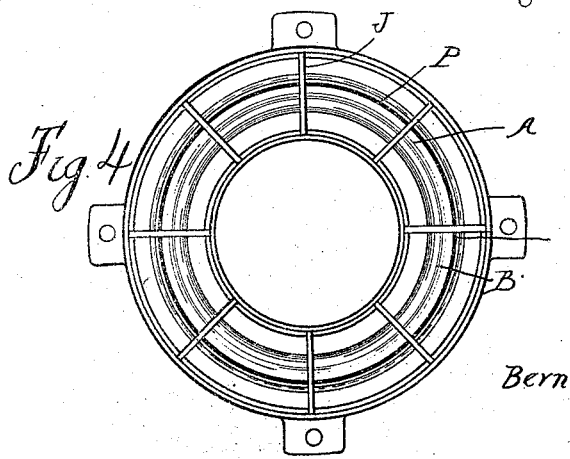
Inventor
Bernard Granville
By Whittemore Hulbert & Whittemore
Attorneys

UNITED STATES PATENT OFFICE.

BERNARD GRANVILLE, OF NEW YORK, N. Y.

APPARATUS FOR FORMING TIRE-MOLDS.

1,299,456.

Specification of Letters Patent.  Patented Apr. 8, 1919.

Application filed January 18, 1917. Serial No. 143,194.

*To all whom it may concern:*

Be it known that I, BERNARD GRANVILLE, a citizen of the United States of America, residing at New York, in the county of New York and State of New York, have invented certain new and useful Improvements in Apparatus for Forming Tire-Molds, of which the following is a specification, reference being had therein to the accompanying drawings.

The invention relates to the art of manufacturing pneumatic tires and other articles formed of vulcanized rubber fabric, and it is the object of the invention to facilitate the manufacture of the molds in which the tires are fashioned. It is usual to form these molds out of cast metal, the molding surface thereof being accurately machined and polished to present a smooth face of the desired contour. This is a slow and laborious operation, and where, as is usually the case, a large number of duplicate molds are required in manufacturing the goods, each additional mold increases the delay and expense. With my improved method the machining and polishing operation is entirely eliminated and any number of duplicate molds may be formed from a single master.

In the drawings:

Figure 1 is a cross-section illustrating the manner of casting a metallic mold from a master mold;

Fig. 2 is a plan view of one of the sections of the completed mold;

Figs. 3 and 4 are diagrammatic plan views illustrating the manner of compensating for contraction of the metal in cooling.

In the construction of molds for the manufacture of tires there is an outer mold usually formed in complementary sections and a core which is placed within the outer mold. In the drawings I have illustrated the method of forming one of the outer mold sections, but the same method may be applied to the forming of the core.

As shown, A is a master mold, which is formed of suitable material having a high fusing point and high rate of heat conduction, such as cast-iron, steel or other metals or alloys. This master mold is accurately machined and polished to correspond to the molding face of the tire mold, this being the inner face B of the mold cavity in the construction shown. The member A is mounted on a member C of larger mass, which may be formed integral therewith, but is preferably separately formed, said member operating in connection with the member A as a chill for quickly absorbing the heat of the cast metal.

In casting the tire mold, the members A and C are arranged at one side of a mold cavity formed in a sand-mold. Preferably the sand is placed in a suitable flask, which as shown comprises an outer ring D and inner ring E tied together by bars J spaced around the circumference and supported upon the member C and accurately positioned by guide pins G thereon. A pattern corresponding to the mold cavity H is placed upon the member C, and the sand is placed in the flask and tamped and struck off in the usual manner. There are also formed sprue connections I, which extend through the body of sand and communicate with the mold cavity. After the sand-mold is formed the flask is reversed, the pattern removed and the flask replaced in the position shown in Fig. 1. The molten metal is then poured into the mold through risers K, which extend to a greater height than the mold cavity and therefore exert a hydrostatic pressure upon the metal therein. The metal coming in contact with the hard surface of the master mold A will be chilled and solidified in a dense structure which is the exact counterpart of the master. Registering lugs L are preferably formed on opposite sides of the mold to receive pins M.

To prevent difficulty in removing the master mold from the mold due to contraction of the latter in cooling, said master mold may be formed in a plurality of sections, as illustrated in Fig. 3. As therein shown, the master is formed of four segmental sections A' A² A³ and A⁴, having abutting ends, with a filling of graphite or other suitable material therebetween, indicated at O. During the process of cooling the pressure exerted by the contraction of the metal will squeeze out the material O from between the ends of the adjacent sections of the master mold, thereby compensating for contraction and permitting of the easy removal of the master.

A modified construction for accomplishing the purpose just described is that shown in Fig. 4, in which the outer annular face of the master is covered with a coating P which is squeezed out by the contracting metal, compensating for the decrease in diameter.

The mold sections formed in the manner just described are provided with highly polished dense molding faces, which are superior to the machined and polished surfaces formed by the ordinary process.

Any suitable material may be used as compressible medium for compensating for contraction of the cast-metal, but I preferably employ a mixture of graphite and kerosene. This material will not spit or produce blow-holes in the cast-metal in contact therewith, and at the same time when subjected to the pressure of the contracting metal is sufficiently plastic to be forced out.

What I claim as my invention is:

An apparatus for forming duplicate metallic molds, comprising an annular master mold having a polished surface corresponding to the molding surface of each of the duplicate molds, a plate in heat conducting contact with said master mold and of sufficient mass to form therewith a chill, a flask for forming a sand mold to complete the mold cavity around said master mold, and means permitting relative movement of portions of the master mold to compensate for contraction of the cast-metal in contact therewith.

In testimony whereof I affix my signature.

BERNARD GRANVILLE.